(12) United States Patent
Park

(10) Patent No.: US 7,176,884 B2
(45) Date of Patent: Feb. 13, 2007

(54) DISPLAYED VIEWING AREA SWITCHING DEVICE IN A COMPUTER

(75) Inventor: Bum-su Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 572 days.

(21) Appl. No.: 10/677,347

(22) Filed: Oct. 3, 2003

(65) Prior Publication Data
US 2004/0135767 A1 Jul. 15, 2004

(30) Foreign Application Priority Data
Dec. 30, 2002 (KR) .................. 10-2002-0086902

(51) Int. Cl.
*G09G 5/00* (2006.01)
(52) U.S. Cl. ...................... 345/156; 345/168
(58) Field of Classification Search ............. 345/156, 345/157, 158, 159, 160, 161, 163, 164, 167, 345/168, 169
See application file for complete search history.

(56) References Cited

U.S. PATENT DOCUMENTS 6,184,868 B1 * 2/2001 Shahoian et al. .......... 345/161

6,976,228 B2 * 12/2005 Bernhardson ............... 715/830

FOREIGN PATENT DOCUMENTS

| JP | 8-249123 | 9/1996 |
|---|---|---|
| JP | 9-134248 | 5/1997 |
| JP | 2000-267786 | 9/2000 |
| JP | 2001-255995 | 9/2001 |
| JP | 2001-255996 | 9/2001 |
| JP | 2001-290590 | 10/2001 |
| JP | 2002-7055 | 1/2002 |

* cited by examiner

*Primary Examiner*—Richard Hjerpe
*Assistant Examiner*—Jean Lesperance
(74) *Attorney, Agent, or Firm*—Staas & Halsey LLP

(57) ABSTRACT

A displayed viewing area switching device has a switch support, at least three button switches disposed separately in a radial manner on the switch support, each with operating buttons toward the center of the switch support, a manipulation lever having a plurality of manipulation projections corresponding to the operating buttons of the button switches a lever guide supporting the manipulation lever to slide radially, and a spring member having an elastic force resistant to the radial sliding motion of the manipulation lever. This configuration allows the manipulation projections to press the corresponding operating buttons by the radial sliding motion of the manipulation lever to generate movement signals moving the displayed viewing area in radial directions.

16 Claims, 8 Drawing Sheets

DISPLAYED VIEWING AREA SWITCHING DEVICE IN A COMPUTER

CROSS-REFERENCE TO RELATED APPLICATIONS

This application claims the benefit of Korean Patent Application No. 2002-86902, filed Dec. 30, 2002, in the Korean Intellectual Property Office, the disclosure of which is incorporated herein by reference.

BACKGROUND OF THE INVENTION

1. Field of the Invention

The present invention relates, in general, to a displayed viewing area switching device, and more particularly, to a displayed viewing area switching device which can be activated by a radial sliding movement.

2. Description of the Related Art

Generally, switching devices have been widely used in turning on and off power supply to electric or electronic apparatuses. As one example, a seesaw switch has commonly been used, which is constructed to gain designated signals and electric operations by pressing the switch with alternating up-and-down or backward-and-forward movements, on the basis of a designated central axial line. The seesaw switch has commonly been employed in electric home appliances including microwave ovens, refrigerators, etc. Recently, the seesaw switch has also been used in portable computers.

These days computer systems generally available in commerce have adopted a WINDOWS-based operation system as the basic operating system. Likewise, portable computers have also adopted the WINDOWS-based operation system as the basic operating system. Application programs under the WINDOWS operating system typically display horizontal and vertical scroll bars on the bottom of a window (i.e., a display screen area) and/or in the right side of the window. When a part of a document is not visible on the monitor because the document is beyond the frame of the active window, the displayed scroll bar is manipulated so as to allow the invisible part to be displayed on the monitor. A seesaw switch can also be provided in the computer system as a scroll manipulator manipulating the displayed scroll bar.

With reference to FIGS. 1 to 3, a switching device using a seesaw switch configuration and manipulating the scroll bar on an active window in the portable computer will be described by way of example. FIG. 1 is a perspective view of a conventional portable computer system. As shown in this figure, the conventional portable computer system comprises a computer body 101 in which a multiplicity of hardware units including a central processing unit (CPU) are built, and a monitor 102 receiving picture signals from the computer body 101 and displaying them thereon.

The computer body 101 comprises a casing 103 defining an external appearance of the computer body 101, a number of hardware units including a motherboard on which the CPU and RAM and so on are mounted, and a keyboard 104 for inputting data. On the top of the casing 103 are disposed a touch pad 105 for moving a pointer on an active window, a pair of selection buttons 107 for selecting a position when the pointer is located, and a seesaw switch 110 provided between the pair of selection buttons 107, as a scroll bar manipulator manipulating the vertical scroll bar provided in the right side of the active window under a WINDOWS application program.

The switching device 110 provided in the conventional portable computer, as illustrated in FIGS. 1 through 3, comprises a switch support 120, a pair of button switches 130 separated from each other and disposed on the switch support 120, a manipulation lever 150 having a pair of pressing parts 155 corresponding to the button switches 130 and disposed, respectively, adjacent to tops of the button switches 130, a rotation supporting means 170 supporting the manipulation lever 150 in a rotatable manner along a designated central axial line, a housing cover 140 disposed between the pair of button switches 130 and the manipulation lever 150, and on which the manipulation lever 150 is seated with a pair of coil springs 161 disposed between the manipulation lever 150 and the housing cover 140, making the manipulation lever 150 recoverable to its original position after being pressed down toward the housing cover 140.

The switch support 120 is a panel-shaped PCB (printed circuit board) inside the casing 103 and supporting the button switches 130. The switch support 120 receives scroll signals from the button switches 130 and transmits them to a motherboard (not shown) of the portable computer 101. Each button switch 130 is a tact switch which is designed to electrically transmit pulse (control) signals in response to the manipulation lever 150 as pressed against the pair of button switches 130. If the manipulation lever 150 is pressed, the tact switch transmits scroll signals to manipulate the scroll bar on an active application program to the motherboard.

The manipulation lever 150 includes the pair of pressing parts 155 respectively corresponding to the button switches 130, a pair of bosses 157 provided on the real of the manipulation lever 150 to be inserted into corresponding engaging parts 143 of the housing cover 140 (to be described later). The pair of depressed parts 151 are depressed from the plane of the manipulation lever 150 so that the user can easily press the pressing parts 155. In particular, the pressing parts 155 are projected from the plane of the rear of the manipulation lever 150 toward the button switches 130, so that they can contact the respective button switches 130 if the depressed parts 151 are pressed down toward the button switches 130.

The boss 157 is projected from the center of the plane of the manipulation lever 150 along the lengthwise direction, so as to allow the manipulation lever 150 to detach in an easy manner from the housing cover 140 when in an engagement with the engaging parts 143 of the housing cover 140.

The rotation supporting means 170 comprises a lever support 171 projected in the center of the housing cover 140 and supporting the manipulation lever 150, and a torsion coil spring 175, the center of which is supported by the lever support 171 and both ends of which support the rear of the manipulation lever 150.

The housing cover 140 is provided integrally with the casing 103 adjacent to the top of the button switches 130, and comprises the pair of engaging parts 143 into which the respective bosses 157 of the manipulation lever 150 are inserted, and a pair of openings through which respectively the pair of button switches 130 are seated. The housing cover 140 is depressed from the plane of and along the edges of the housing cover 140, within which the manipulation lever 150 is situated. Each engaging part 143 comprises a penetrating hole provided on both side walls of the housing cover 140, with which the boss 157 is engaged, so as to engage the manipulation lever 150 as well as to assist in the rotation of the manipulation lever 150 along the designated central axial line.

Between the housing cover 140 and the manipulation lever 150 is provided a pair of coil springs 161. One end of the coil spring 161 contacts the top surface of the housing cover 140 and the other end thereof contacts the rear of the manipulation lever 150. When the manipulation lever 150 is pressed, the coil spring 150 is compressed, to thereby allow one of the pressing parts 155 and one of the button switches 130 to contact each other. Also, when the pressure given to the manipulation lever 150 is removed, the coil spring 161 is elastically recovered, to thereby allow the manipulation lever 150 to be returned to its original position. For this purpose, a guide part (not shown) for preventing an arbitrary movement of the coil spring 161 is projected on either side of the housing cover 140 or the manipulation lever 150.

Operating processes of the switching device 110 with the above-described configuration, to manipulate the scroll bar on an active application program in the portable computer 101 will be described. If the user presses one of the depress parts 151 of the manipulation lever 150 to move the scroll bar, the manipulation lever 150 rotates by centering around the rotation supporting means 170 and the bosses 157 (i.e., the manipulation level 150 rotates based upon a designated central axial line), to thereby compress the coil spring 161. Thus, one of the corresponding pressing parts 155 of the manipulation lever 150 is allowed to contact one of the corresponding button switches 130 to transmit scroll signals to the switch support 120. The scroll signals transmitted from the button switches 130 are transmitted to the motherboard through the switch support 120, to thereby allow the scroll bar to be moved. If the force pressed to the depressing parts 151 is removed, the coil spring 161 is elastically recovered to a vertical direction, to thereby allow the manipulation lever 150 to be returned to its original position.

A variety of computer-based games have recently been developed, which have gained user popularity. Among the computer-based games, in some cases the whole viewing areas of games cannot be displayed on the active window of the monitor, and thus, only a part of the whole areas are displayed. In this regard, there has been a need for a switching device promptly displaying the invisible (i.e., non-displaying) areas of the computer game and to manipulate, such as move, the displayed view area on the monitor in various manners.

However, as described above, the switching device 110 employed in the conventional portable computer is a seesaw switch constructed with the rotation supporting means 170 based on a designated central axial line. Further, the seesaw switch requires the pair of coil springs 161, etc., to configure a seesaw, which can be a complicated structure. Further, the seesaw switch can only manipulate one displayed scroll bar at a time, typically the displayed vertical scroll bar provided in the right side of an active window under a WINDOWS application program. Therefore, the conventional seesaw switch cannot move more than one displayed scroll bar, for example, the displayed horizontal and vertical scroll bars. Further, the conventional seesaw switch cannot quickly move the displayed viewing area and/or move the displayed viewing area in various manners while the user, for example, is playing a computer-based game whose whole viewing areas are not displayed on the monitor.

SUMMARY OF THE INVENTION

Accordingly, the present invention provides a switching device, having a simplified construction, capable of manipulating a scroll bar displayed horizontally and vertically in an active window, and capable of promptly and in various manners moving an active window to allow an invisible display area of the active window to be displayed on the monitor, for example, during execution of a computer game.

Additional aspects and advantages of the invention will be set forth in part in the description which follows and, in part, will be obvious from the description, or may be learned by practice of the invention.

The present invention may be achieved by providing a switching device comprising a switch support; a plurality of button switches disposed in a radial manner separated from each other on the switch support, each button switch provided with operating buttons toward center of the switch support; a manipulation lever having a plurality of manipulation projections corresponding to the plurality of operating buttons of the button switches; a lever guide supporting the manipulation lever so that the manipulation lever is slidable in a radial manner; and a spring member having an elastic force resistant to the radial sliding motion of the manipulation lever, the manipulation projections corresponding to operating buttons being pressed by the radial sliding motion of the manipulation lever.

According to an aspect of the invention, the plurality of the button switches are four button switches, and the plurality of the manipulation projections on the manipulation level are four manipulation projections corresponding to the four operating buttons of the four button switches.

According to an aspect of the invention, each manipulation projection corresponding to each operating button can press two of the operating buttons simultaneously in response to the radial sliding motion of the manipulation lever.

According to an aspect of the invention, the spring member is cross-shaped, the center of which is coupled between the four manipulation projections.

According to an aspect of the invention, four spring supports supporting the spring member are provided on the rear of the lever guide, and each end of the cross-shaped spring member is coupled to each spring support.

According to an aspect of the invention, the spring member is disposed between the button switches.

According to an aspect of the invention, the respective ends of the spring member are laterally bent at an angle of 90 degrees, and coupled to the spring supports.

According to an aspect of the invention, the switch support is a PCB, and each button switch is a tact switch.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
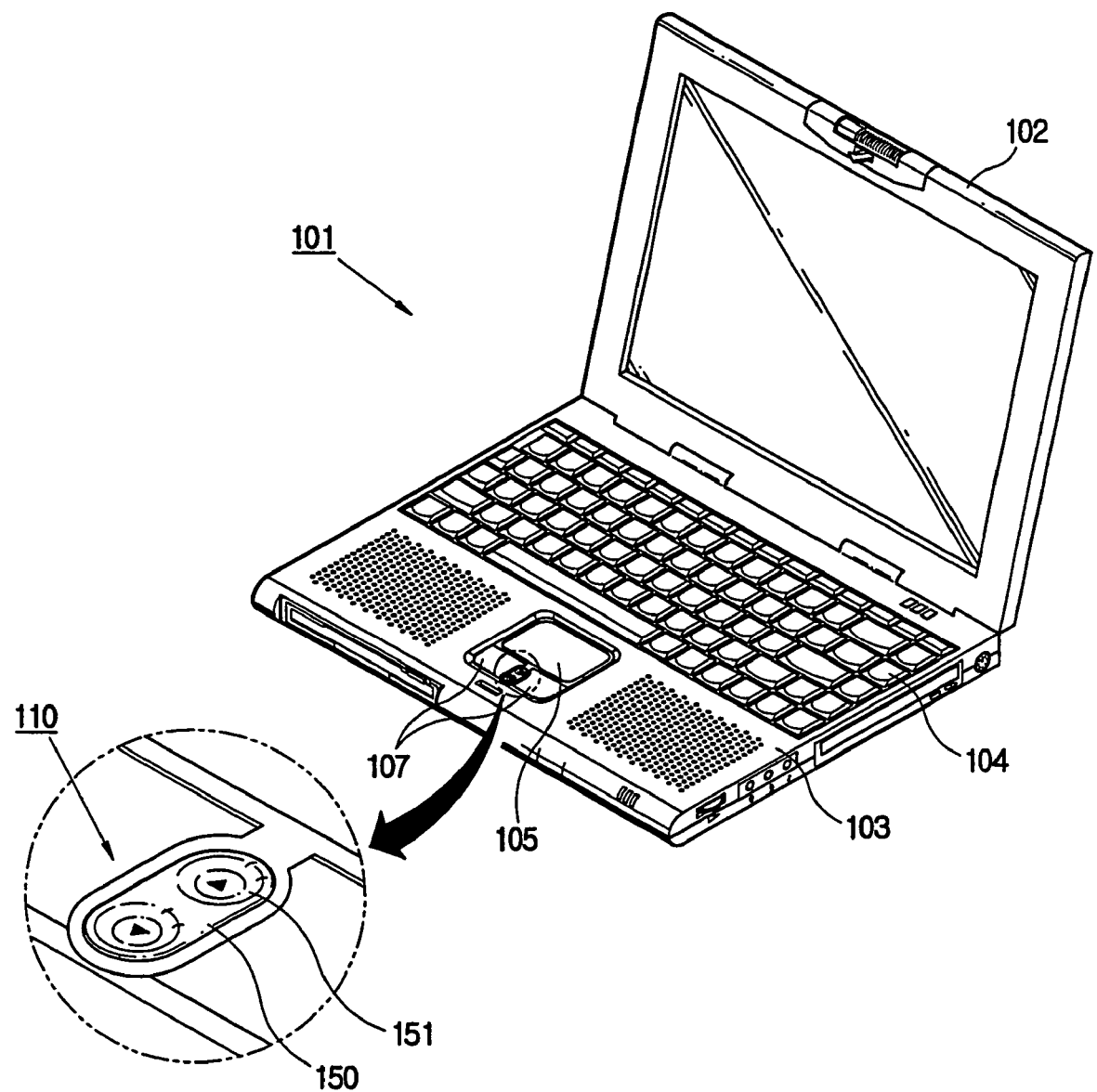
FIG. 1 is a perspective view of a portable computer employing a conventional displayed scroll bar switching device.
Figure 2:
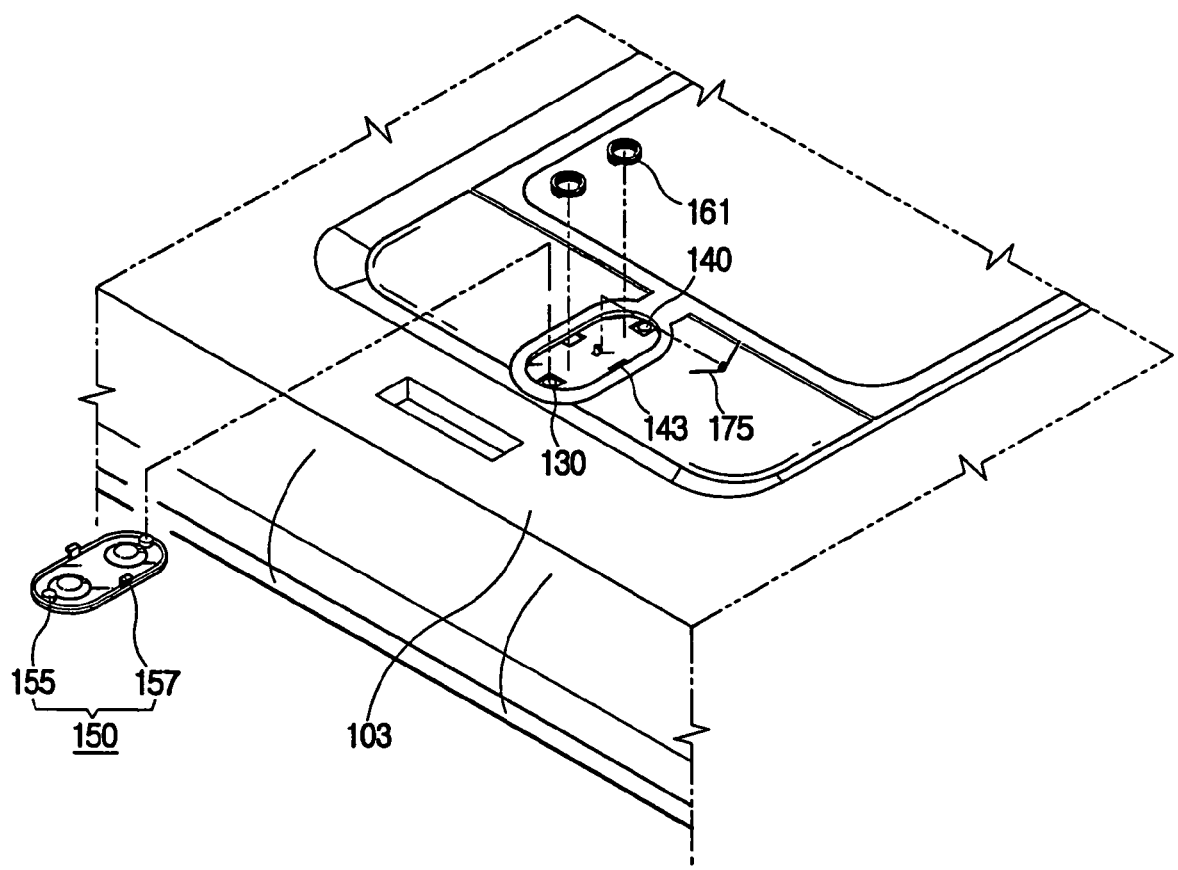
FIG. 2 is an exploded view showing a part of the conventional switching device shown in FIG. 1.
Figure 3:
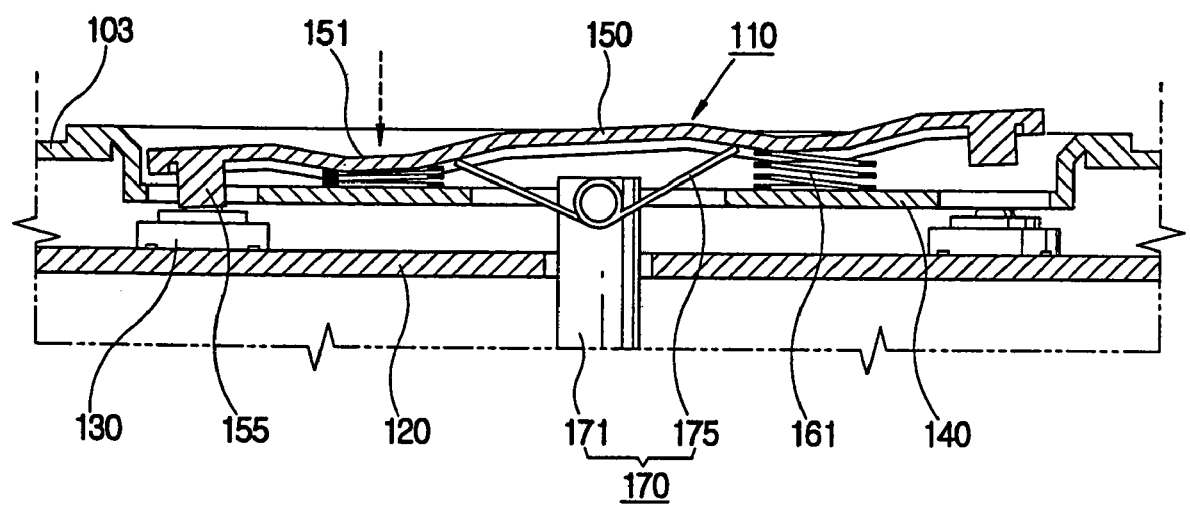
FIG. 3 is a sectional view showing a part of the conventional switching device shown in FIG. 2.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
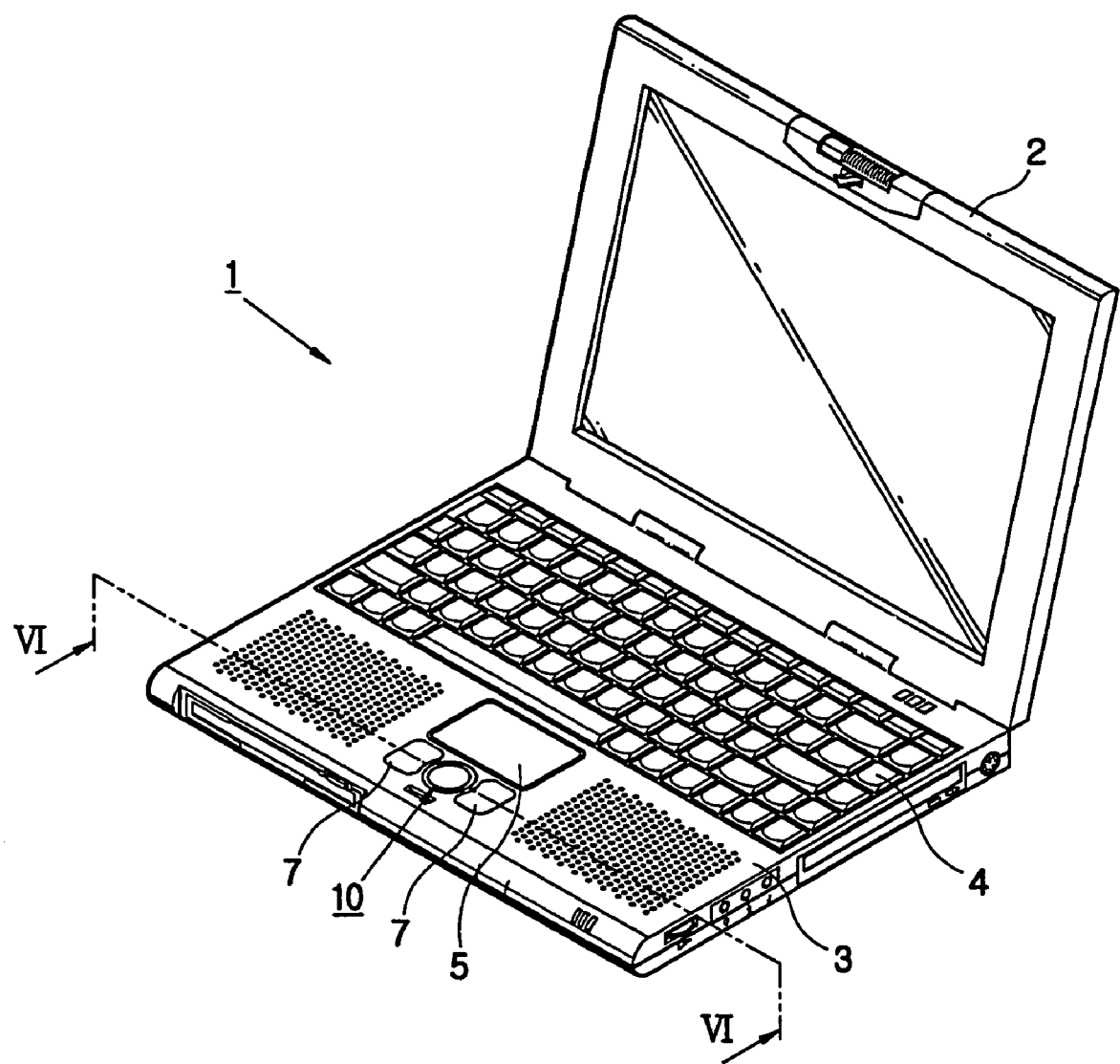
FIG. 4 is a perspective view of a portable computer with a displayed viewing area switching device according to an embodiment of the present invention.

FIG. 4 is a perspective view of a portable computer with a displayed viewing area switching device, according to one embodiment of the present invention. As shown in FIG. 4, the portable computer 1 comprises a computer body/casing 3 in which a multiplicity of hardware units including a central processing unit (CPU), and so on, are built, and a monitor 2 receiving picture signals from the computer body 3 and displaying them thereon. More particularly, the computer body 3 as a casing defines an external appearance of the portable computer 1, and a multiplicity of hardware units are provided inside the casing 3, such as a motherboard (not shown), on which the CPU, a RAM, and the like, are mounted, and a keyboard 4 for inputting data.

Typically, on the top of the casing (computer body) 3 are provided a touch pad 5 for moving a pointer on an active window displayed on the monitor 2 by a WINDOWS application program, a pair of selection buttons 7 for selecting a position where the pointer is located, and a displayed viewing area switching device 10 disposed between the pair of selection buttons 7 and allowing manipulation of horizontal and vertical scroll bars displayed in the bottom or in the right side of the active window, or allowing the displayed viewing area to be promptly moved in various manners so that an invisible viewing area, for example, when a computer game is executed (played), is displayed on the monitor 2.

Figure 5:
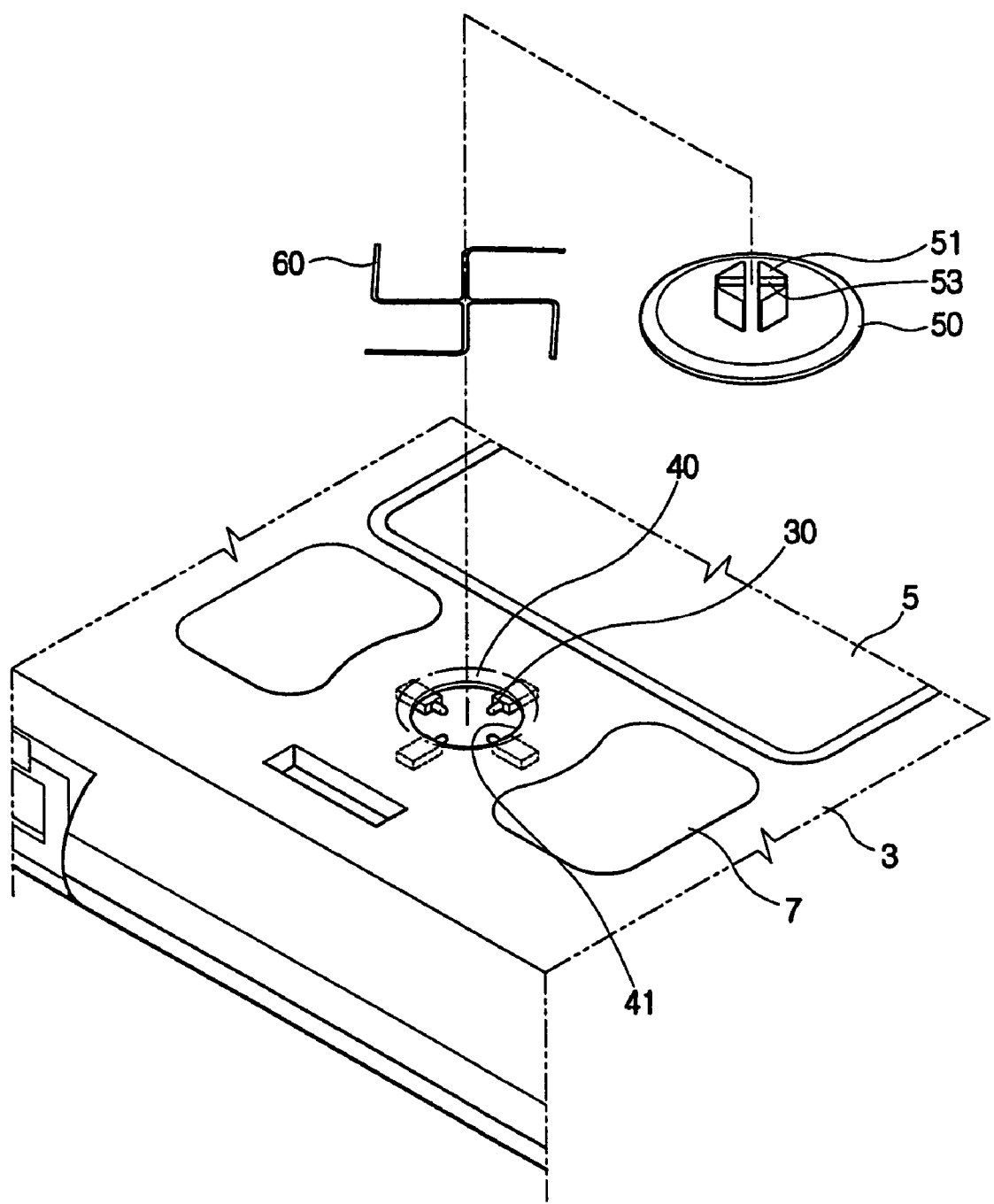
FIG. 5 is an exploded view showing a part of the switching device shown in FIG. 4.
Figure 6:
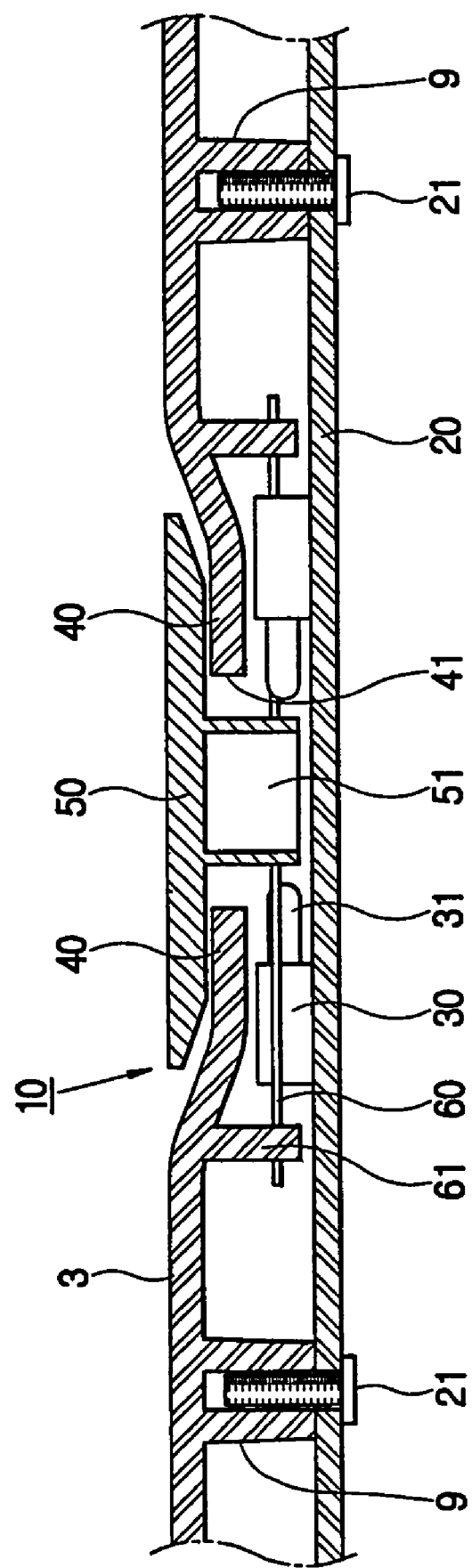
FIG. 6 is a sectional view showing a part of the switching device shown in FIG. 4.

The displayed viewing area switching device (hereinafter referred to as the switching device) 10, as illustrated in FIGS. 4 through 6, comprises a switch support 20, a plurality (i.e., two or more, typically four, eight, etc.) of button switches 30 separated from each other are disposed on the switch support 20 in a radial direction (i.e., along a line extending from a center of a circle), and each button switch 30 is provided with an operating button 31 toward the center of the switching device, a manipulation lever 50 having a plurality of manipulation projections 51 respectively corresponding to the operating buttons 31 of the button switches 30, a lever guide 40 supporting the manipulation lever 50, so as to allow the manipulation lever 50 to be slid in a radial direction, and a spring member 60 having an elastic force resisting the redial sliding motion of the manipulation lever 50. The switching device 10 is so designed that as the manipulation level 50 is radially slid, each manipulation projection 51 presses against each corresponding respective operating button 31.

As shown in FIG. 6, the switch support 20, which is a planar shaped PCB, is provided inside the casing 3 defining the external appearance of the portable computer. The switch support 20 is coupled to the plurality of button switches 30 to support them and is engaged by screws 21 with a plurality of engaging bosses 9 provided on the rear of the casing 3. The switch support 20 receives operation (control) signals from the button switches 30 and transmits the received control signals to the motherboard (not shown) of the portable computer 1.

As an example embodiment, as shown in FIG. 5, four button switches 30 are provided and assembled with the switch support 20. Each button switch 30 is provided with the operating button 31, which is moved as the manipulation projections 51 of the manipulation lever 50 are pressed against the operating button 31. The four button switches 30 are disposed on the switch support 20 in a radial manner, for example, the button switches 30 are disposed at a 90 degrees angle to each other, so that each operating button 31 provided at each button switch 30 is disposed oppositely to each other on the switch support 20. Typically, each button switch 30 is a tact switch designed to electrically transmit pulse (control) signals in response to an operation (e.g., up and down movement) of the operating button 31. In particular, each manipulation projection 51 of the manipulation lever 50 as slid radially is allowed to press the corresponding operating button 31 of the button switch 30, so that the button switch 30 can transmit radius signals as the operation signals to the motherboard through the PCB switch support 20. The motherboard having received the radius signals can be programmed (e.g., an application program, etc.) to manipulate any scroll bars activated under an application program and displayed on the monitor 2, or move in a prompt and various manners to any viewing area invisible on the monitor 2 (i.e., can manipulate the viewing area), for example, when a computer game and so on is executed, based upon the received radius signals.

As shown in FIG. 5, typically, the manipulation lever 50 is a circular shaped plate, being provided in the lever guide 40 supporting the manipulation lever 50 in a radially slidable manner. On the rear of the manipulation lever 50 are provided the four manipulation projections 51 corresponding to the four operating buttons 31 of the four button switches 30 disposed on the switch support 20. The manipulation projections 51, which can be triangular shaped, are disposed in a radial manner around the center of rear of the manipulation lever 50. The manipulation projections 51 have a flat surface to allow the corresponding operating buttons 31 to be easily pressed by the manipulation projections 51. Between the manipulation projections 51 are formed spring engaging parts 53 into which a spring member 60 is engaged. The manipulation projections 51 corresponding to the operating buttons 31 can press against the operating buttons 31 in response to a radial sliding motion of the manipulation lever 50, and advantageously also allow the pressing of two operating buttons 31 of two adjacent button switches 30. Accordingly, the displayed viewing area switch 10 allows movement of a displayed viewing area in various manners other than horizontal and/or vertical movements, which can be advantageous when playing games.

As shown in FIGS. 5 and 6, the lever guide 40 is formed integrally with the casing 3 adjacent to the top area of the button switches 30. The lever guide 40 is inwardly depressed from the casing 3, having a larger diameter than an external diameter of the manipulation lever 50, so that the manipulation lever 50 can be seated thereon and radially slidable. In particular, in the center of the lever guide 40 is formed an opening part 41, allowing the manipulation projections 51 of the manipulation lever 50 to pass through the opening part 41 and thereby press the corresponding operating buttons 31 of the button switches 30.

Further, as shown in FIG. 6, a multiplicity of spring supports 61 on the rear edges of the lever guide 40 support the spring member 60. In each end of the spring supports 61 is formed a space as wide as designated, through which the ends of the spring member 60 are inserted to be coupled with the spring support 61. More particularly, as shown in FIG.

5, the spring member 60 is cross-shaped with four ends so as to have an elastic resistance to the radial sliding motion of the manipulation lever 50. The center of the spring member 60 is engaged into the spring engaging parts 53 provided between the manipulation projections 51. Each end of the spring member 60 is laterally bent at an angle of 90 degrees and engaged with each corresponding spring support 61 provided on the rear of the lever guide 40. Lateral bending of each end of the spring member 60 at an angle of 90 degrees is designed to prevent the spring member 60 from being easily detached from the spring supports 61 due to the radial sliding motion of the manipulation lever 50 coupled to the center of the spring member 60. According to an aspect of the present invention, the cross-shaped spring member 60 is positioned between the button switches 30 to minimize the thickness of the switching device 10 mounted on the portable computer 1 by minimizing the space between the switch support 20 and the manipulation lever 50.

Therefore, the spring member 60 is coupled by the spring engaging parts 53 provided between the manipulation projections 51 of the manipulation lever 50 and the spring supports 61 provided on the rear of the lever guide 40, thereby supplying an elastic force resistant to the radial sliding motion of the manipulation lever 50. The spring member 60 supplies the elastic force so that the manipulation projections 51 of the manipulation lever 50 are positioned in the center of the manipulation lever 50 and not contacting the operating buttons 31 of the button switches 30 when the manipulation lever 50 is not being manipulated (i.e., makes no radial sliding motion).

Figure 7A:
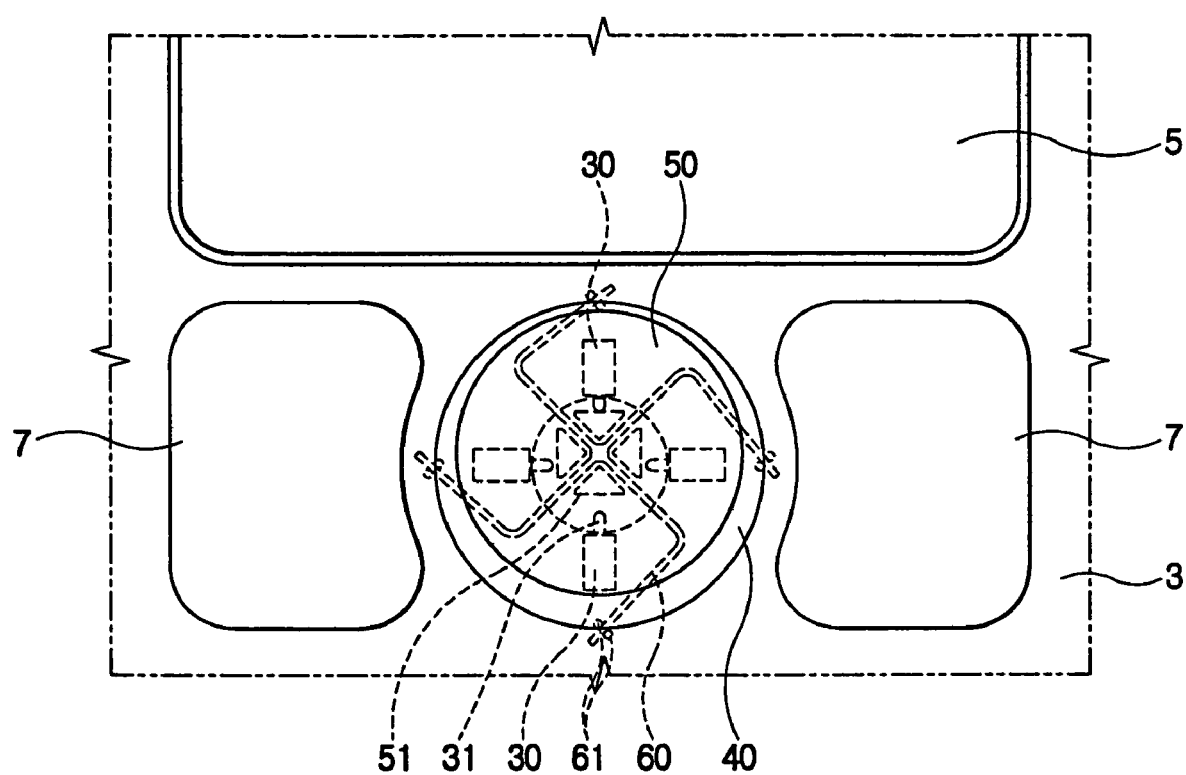
FIGS. 7A and 7B are top plan views showing an operation of the switching device shown in FIGS. 4 through 6.
Figure 7B:
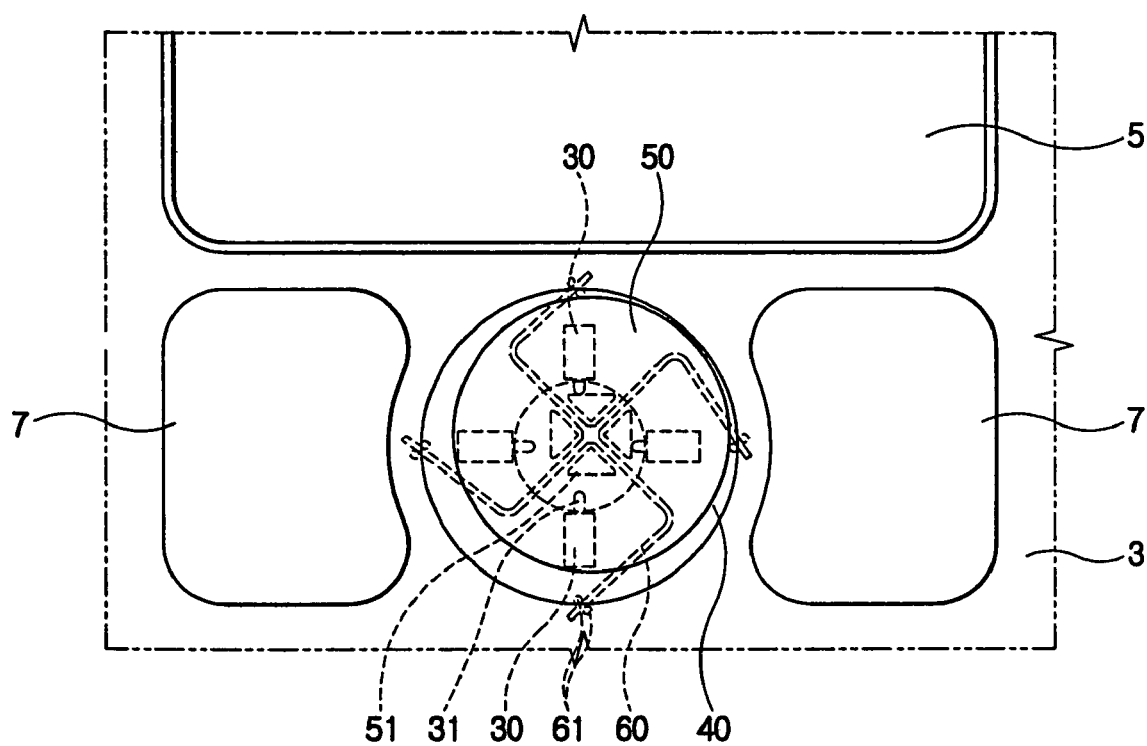

Operating processes of the displayed viewing area switching device 10 with the above-described example configuration, mounted on the portable computer 1, will be described with reference to FIGS. 7A and 7B. If one of the four manipulation projections 51 presses one of the operating buttons 31 corresponding thereto by suppressing the elastic force of the spring member 60 in response to the radial sliding motion of the manipulation lever 50, the scroll bar displayed on the monitor 2 is ready to be directed either vertically or horizontally to move, such as scroll, a displayed viewing area horizontally or vertically (see FIG. 7A). However, if, for example, two of the four manipulation projections 51, adjacent to each other, press two adjacent operating buttons 31 corresponding thereto by suppressing the elastic force of the spring member 60 in response to the radial sliding motion of the manipulation lever 50, the displayed viewing area can be moved depending upon the two pressed manipulation projects to the viewing area not visible on the monitor 2, which can be advantageous when, for example, a computer game and so on is executed. For example, if the operating buttons 31 of the two button switches 30 in up and right directions, from among the four button switches 30 in the four directions, are pressed, the control signals involved in this motion (i.e., radius signals) are transmitted to the motherboard through the PCB switch support 20, and the viewing area between the up and right directions invisible on the monitor 2 is displayed on the monitor 2 by the program displaying in the viewing area (i.e., by the application program controlling the displayed active window) (see FIG. 7B).

The switching device 10 according to the present invention is capable of manipulating any displayed scroll bars or promptly moving to invisible areas on the monitor 2 in at least four directions including at least directions between the up and the right directions, between the right and the down directions, between the left and the up directions, and between the left and the down directions.

In the above-described embodiment, the spring support 61 has been provided on the rear of the lever guide 40. However, the spring support 61 can be provided on the rear of the casing 3 so that it can be coupled to one end of the spring member 60. Further, in the above-described embodiment, four button switches 30 have been provided. However, the number of the button switches 30 are not limited to four button switches 30, and two or more (i.e., typically four or more) button switches 30 can be provided radially to be pressed as the manipulation lever 50 is radially slid. Accordingly, although in the above-described embodiment four manipulation projections 51 are provided, which allow simultaneous pressing of two of the corresponding operating buttons 31, the present invention is not limited to such a configuration, and four or more, such as eight, manipulation projections 51 may be provided and configured with crossing members forming a spring providing an elastic resistance to the radial sliding motion of the manipulation lever 50 to allow simultaneous pressing of one or more corresponding operating buttons 31 of the manipulation projections 51.

One embodiment of the present invention has been described with reference to a portable computer employing the switching device 10. However, the present invention is not limited to such a configuration and the switching device 10 can be applied to a variety of products, such as a computer keyboard, computing (information processing) products displaying information on a display, such as cellular phones, etc. Further, although, in the above-described embodiment, a tact switch has been described as an example of the button switch 30, the present invention is not limited to such configuration and the button switch 30 can be replaced with other various switches, including a push button switch, and so on.

The switching device according to the present invention is constructed with a switch support, a plurality of button switches provided on the switch support, a manipulation lever with which the button switches are activated, a lever guide supporting the manipulation lever in a radially slidable manner, and a spring member having an elastic force resistant to the radial sliding motion of the manipulation lever, wherein each button switch can be activated in response to the radial sliding motions of the manipulation lever. The switching device with this configuration is advantageous because its structure is simple, and any displayed scroll bars, including horizontal and/or vertical, can be manipulated as well as a displayed viewing area on the monitor can be moved in various directions to any viewing area invisible on the monitor, for example, 8 directions, which can be advantageous when executing a computer game.

Accordingly, the present invention provides a radial sliding switch as a displayed viewing area manipulator (an active window radial scroller) scrolling, or moving further, a displayed viewing area along designated radiuses according to radius (radial direction) signals from radially disposed (positioned) switches activated (controlled/operated) by suppressing a spring having an elastic force resistant to a radial motion of a lever manipulating the switches (i.e., by suppressing a radially tensioned spring). More particularly, the controlled radially disposed switches are tied to moving a displayed active window in any radial direction on a display device by generating corresponding radius-based movement signals.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer displayed viewing area switching device, comprising:
   a switch support;
   at least three button switches disposed separately from each other in a radial manner on the switch support, each button switch provided with an operating button toward a center of the switch support;
   a manipulation lever having at least three manipulation projections corresponding to the operating buttons of the button switches;
   a lever guide supporting the manipulation lever to be radially slidable; and
   a spring member disposed between the manipulation lever and the switch support, the spring member having an elastic force resistant to the radial sliding motion of the manipulation lever, and allowing the manipulation projections to press the corresponding operating buttons by the radial sliding motion of the manipulation lever to generate movement signals moving the displayed viewing area in any radial direction.

2. The switching device according to claim 1, wherein four button switches are disposed on the switch support and the manipulation lever has four manipulation projections corresponding to the four operating buttons of the four button switches.

3. The switching device according to claim 2, wherein the spring member is cross-shaped, a center of which is coupled between the four manipulation projections.

4. The switching device according to claim 3, wherein four spring supports supporting the spring member are provided on a rear side of the lever guide, and each end of the cross-shaped spring member is coupled to each spring support, respectively.

5. The switching device of claim 3, wherein the switching device is provided in a computer casing and four spring supports supporting the spring member are provided on a rear side of the computer casing with each end of the cross-shaped spring member coupled to each spring support, respectively.

6. The switching device according to claim 4, wherein each end of the spring member is laterally bent at an angle of 90 degrees, and coupled to each spring support, respectively.

7. The switching device according to claim 1, wherein each manipulation projection corresponding to each operating button can simultaneously press two adjacent operating buttons in response to the radial sliding motion of the manipulation lever.

8. The switching device according to claim 1, wherein the spring member is disposed between the at least three button switches.

9. The switching device according to claim 1, wherein the switch support is a printed circuit board, and each button switch is a tact switch.

10. A computer, comprising:
    a display device;
    a main body processing information and controlling display of the information in a viewing area on the display device; and
    a displayed viewing area manipulator, comprising:
      at least three actively radially disposed switches generating radius signals to move the displayed viewing area along designated radiuses corresponding to the switches;
      a radially slidable manipulation lever; and
      a spring member providing an elastic force resistant to the radial sliding motion of the manipulation lever to allow activation of the switches.

11. The computer of claim 10, further comprising a keyboard on which the displayed viewing area manipulator is disposed.

12. A viewing area switching device, comprising:
    a lever guide supporting a manipulation lever to be radially slidable, the manipulation lever having at least three manipulation projections corresponding to operating buttons of at least three button switches; and
    a spring member disposed between the manipulation lever and a switch support, the spring member having an elastic force resistant to radial sliding motion of the manipulation lever, and allowing the manipulation projections to press the corresponding operating buttons by radial sliding motion of the manipulation lever to generate movement signals moving the viewing area in any radial direction.

13. A method, comprising:
    activating at least three button switches disposed separately from each other in a radial manner, each button switch being provided with an operating button toward a center of a switch support, to generate radius signals, the activating being via a spring member disposed between the at least three button switches, the spring member having an elastic force resistant to radial sliding motion of a manipulation lever to allow manipulation protections of the spring member to activate corresponding operating buttons by radial sliding motion of the manipulation lever; and
    moving a displayed viewing area along designated radiuses corresponding to the switches according to the generated radius signals.

14. The method of claim 13, wherein the moving comprises at least scrolling the displayed viewing area horizontally and vertically.

15. A computer displayed viewing area switching device, comprising:
    at least three button switches disposed separately from each other in a radial manner, each button switch provided with an operating button toward a center of the switch support;
    a radially slidable manipulation lever having at least three manipulation projections corresponding to the operating buttons of the at least three button switches; and
    a spring member disposed between the at least three button switches, the spring member having an elastic force resistant to the radial sliding motion of the manipulation lever to allow the manipulation projections activate the corresponding operating buttons by the radial sliding motion of the manipulation lever to generate displayed horizontal or vertical scroll bar signals scrolling the displayed viewing area in the horizontal or vertical direction.

16. The displayed viewing area switching device of claim 15, wherein the activated operating buttons generate radius signals moving the computer displayed viewing area along designated radiuses corresponding to the switches according to the radius signals.

* * * * *

UNITED STATES PATENT AND TRADEMARK OFFICE
CERTIFICATE OF CORRECTION

PATENT NO. : 7,176,884 B2  Page 1 of 1
APPLICATION NO. : 10/677347
DATED : February 13, 2007
INVENTOR(S) : Bum-su Park It is certified that error appears in the above-identified patent and that said Letters Patent is hereby corrected as shown below:

Column 10, Line 33, change "protections" to --projections--.

Signed and Sealed this

Twenty-second Day of May, 2007

JON W. DUDAS
*Director of the United States Patent and Trademark Office*